June 9, 1959
A. R. MORRIS ET AL
2,889,618
BUSHING EXTRACTOR
Filed Feb. 21, 1957
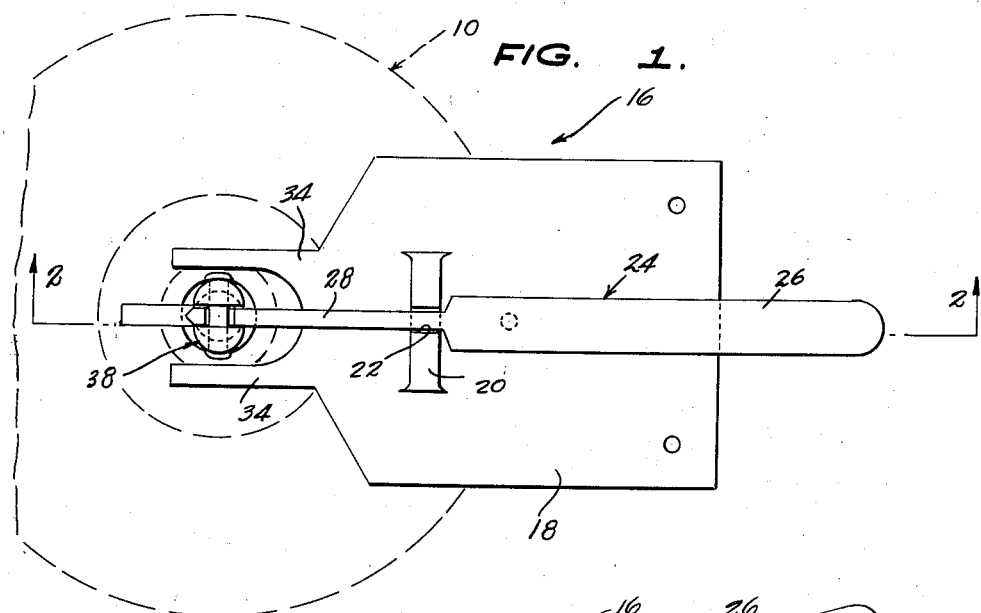
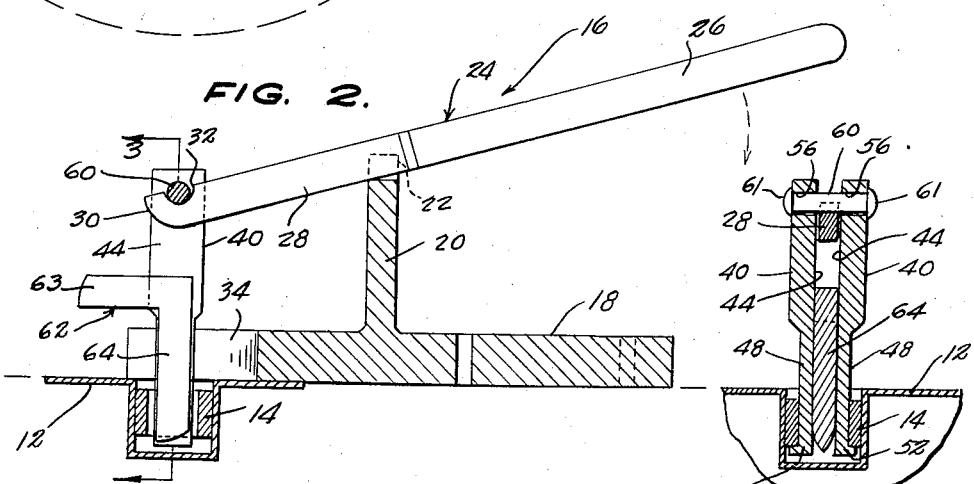
INVENTORS
ANDREW SVAC,
ALBERT R. MORRIS,
BY
McMorrow, Berman & Davidson
ATTORNEYS.

United States Patent Office 2,889,618
Patented June 9, 1959

2,889,618

BUSHING EXTRACTOR

Albert R. Morris and Andrew Svac, Hialeah, Fla.

Application February 21, 1957, Serial No. 641,688

1 Claim. (Cl. 29—267)

This invention relates to an improved bushing extractor.

The primary object of the invention is to provide a more practical and efficient device of this kind, involving a split puller and a removable wedge for expanding the puller, and a base on which is freely fulcrumed a lever which is freely engaged with the puller, the device being simple in construction and composed of a small number of simple parts.

Another object of the invention is to provide a bushing extractor of the character indicated, which can be readily and economically manufactured, is easily used, and is highly satisfactory for the purpose intended.

These together with other objects and advantages which will become apparent reside in the details of construction and operation as more fully hereinafter described and claimed, reference being had to the accompanying drawings, forming a part hereof, wherein like numerals refer to like parts throughout the several views, and in which:

Figure 1 is a top plan view of a bushing extractor of the invention, shown applied to extract a bushing from a support shown in phantom lines;

Figure 2 is a vertical longitudinal section taken substantially on the plane of line 2—2 of Figure 1;

Figure 3 is a vertical transverse section taken substantially on the plane of line 3—3 of Figure 2;

Figure 4 is an enlarged perspective view of the puller assembly of the bushing extractor.

Referring to the drawings in detail, indicated generally at 10 is a work piece incorporating therein a recessed cap 12 having press-fitted therein a tubular bushing 14 to be extracted by the illustrated bushing extractor of the invention, indicated generally at 16.

The bushing extractor 16 comprises an elongated flat base plate 18 having on its upper surface at a point intermediate its forward and rear ends 19 and 21, respectively, an upstanding fulcrum standard 20 having in its upper end a notch 22 located on the central longitudinal axis of the base plate 18. An elongated straight lever 24 incorporates a laterally enlarged handle portion 26 and a forward portion 28. The forward portion 28 has in its upper edge adjacent its forward end 30 an upwardly opening notch 32, the purpose of which is described hereinafter. On the forward end 19 of the base plate 18 and coplanar with the base plate 18 is a pair of laterally spaced longitudinal arms 34 which are to be disposed at opposite sides of a bushing 14 to be extracted.

Indicated generally at 38 is a puller assembly comprising a pair of similar vertically elongated semi-cylindrical blades 40 having confronting flat faces 44.

The outer sides of the blades 40 are reduced adjacent the lower ends of the blades, as indicated at 48, so as to define at the lower ends of the blades laterally outwardly projecting semi-circular flanges 52. The blades 40 are traversed at their upper ends by bores 56 which have slidably extending therethrough a pin 60 having enlarged heads 61 on its outer ends.

As clearly seen in Figure 2, in operation, the puller assembly 38 is inserted into the bore of the bushing 14, with the flanges 52 and 54 disposed beneath the lower edge of the bushing, after which an L-shaped wedge 62 has its vertical leg 64 inserted between the flat surfaces 44 of the blades 40 so as to spread the blades, as seen in Figure 3. The horizontal leg 63 of the wedge 62 is employed as a handle in manipulating the wedge. Thereafter, the notch 32 of the portion 28 of the lever 24 is engaged under the pin 60 with an intermediate part of the lever resting in the notch 22 in the standard 20, and the handle portion 26 of the lever pressed downwardly, so as to elevate the bushing 14 out of the cap 12.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claim.

What is claimed as new is as follows:

A bushing extractor comprising a base plate having a first side, a second side, a forward end and a rear end, a fulcrum standard on and projecting laterally from said first side between said ends, said second side of the base plate at the forward end of the base plate being engageable with a support from which a bushing is to be extracted, a puller engageable in the bore of the bushing having lateral flanges to engage the underside of the bushing a transverse pin on said puller, a lever having a forward end and a rear end, said lever having an intermediate portion thereof freely resting upon said fulcrum standard and having a notch adjacent its forward end freely engaged beneath said pin, said puller comprising a pair of elongated blades having flat facing inner sides and outer sides from which said flanges project, said pin slidably and pivotally traversing said blades with the forward end of the lever engaging the pin between the blades, and an L-shaped wedge having a wedge arm removably and wedgingly positioned between the blades and engaged with said flat inner sides, and a lateral handle arm on said arm for inserting and removing the wedge arm between the blades.

References Cited in the file of this patent

UNITED STATES PATENTS

| 90,559 | Knott | May 25, 1869 |
| 573,801 | Tyrell et al. | Dec. 22, 1896 |
| 1,265,745 | Carpenter | May 14, 1918 |
| 1,444,280 | Slough | Feb. 6, 1923 |
| 1,632,482 | Kroells | June 14, 1927 |
| 2,207,888 | Jones | July 16, 1940 |
| 2,224,031 | Kalbeck | Dec. 3, 1940 |
| 2,322,464 | McKee et al. | June 22, 1943 |
| 2,618,053 | Claps | Nov. 18, 1952 |

FOREIGN PATENTS

| 118,914 | Australia | Sept. 5, 1944 |